United States Patent [19]

Skoli et al.

[11] 4,313,370

[45] Feb. 2, 1982

[54] PASTEURIZING SYSTEM FOR CARBONATED SOFT DRINKS

[75] Inventors: Sigmund P. Skoli, Elmwood Park; William C. Ore, Elmhurst; David M. Kemp, Naperville; Harry G. Mojonnier, River Forest, all of Ill.

[73] Assignee: FMC Corporation, Chicago, Ill.

[21] Appl. No.: 155,301

[22] Filed: Jun. 2, 1980

[51] Int. Cl.³ .............................................. A23L 2/00
[52] U.S. Cl. ..................................... 99/323.1; 99/453; 99/455; 99/483; 261/DIG. 7
[58] Field of Search ................... 99/275, 483, 323.1, 99/323.2, 453, 455; 261/DIG. 7, 127, 128, 131, 130

[56] References Cited

U.S. PATENT DOCUMENTS

| | | | |
|---|---|---|---|
| 3,090,293 | 5/1963 | Plock | 99/323.1 |
| 3,237,808 | 3/1966 | Witt | 222/64 |
| 3,780,198 | 12/1973 | Pahl | 261/DIG. 7 |
| 3,934,042 | 1/1976 | Patrick | 99/275 |
| 3,960,066 | 6/1976 | Knorr | 99/323.2 |

OTHER PUBLICATIONS

Grade 'A' Pasteurized Milk Ordinance (1965 Recommendations) U.S. Department of Health, Education and Welfare.

*Primary Examiner*—Robert W. Jenkins
*Attorney, Agent, or Firm*—Trexler, Bushnell & Wolters, Ltd.

[57] ABSTRACT

A pasteurizing system for soft drinks comprises a single-pass plate-type heat exchanger which is situated flow-pathwise between a supply of prepared beverage liquid and apparatus for cooling and carbonating that liquid. A suitable heat exchange medium is supplied in closed fluid circuit with the plate-type heat exchanger; and advantageously, heat recovery means are situated downstream from the heat exchanger. A holding tube is coupled in fluid circuit downstream from the heat exchanger for retaining the beverage liquid at pasteurization temperature to insure effectiveness.

6 Claims, 1 Drawing Figure

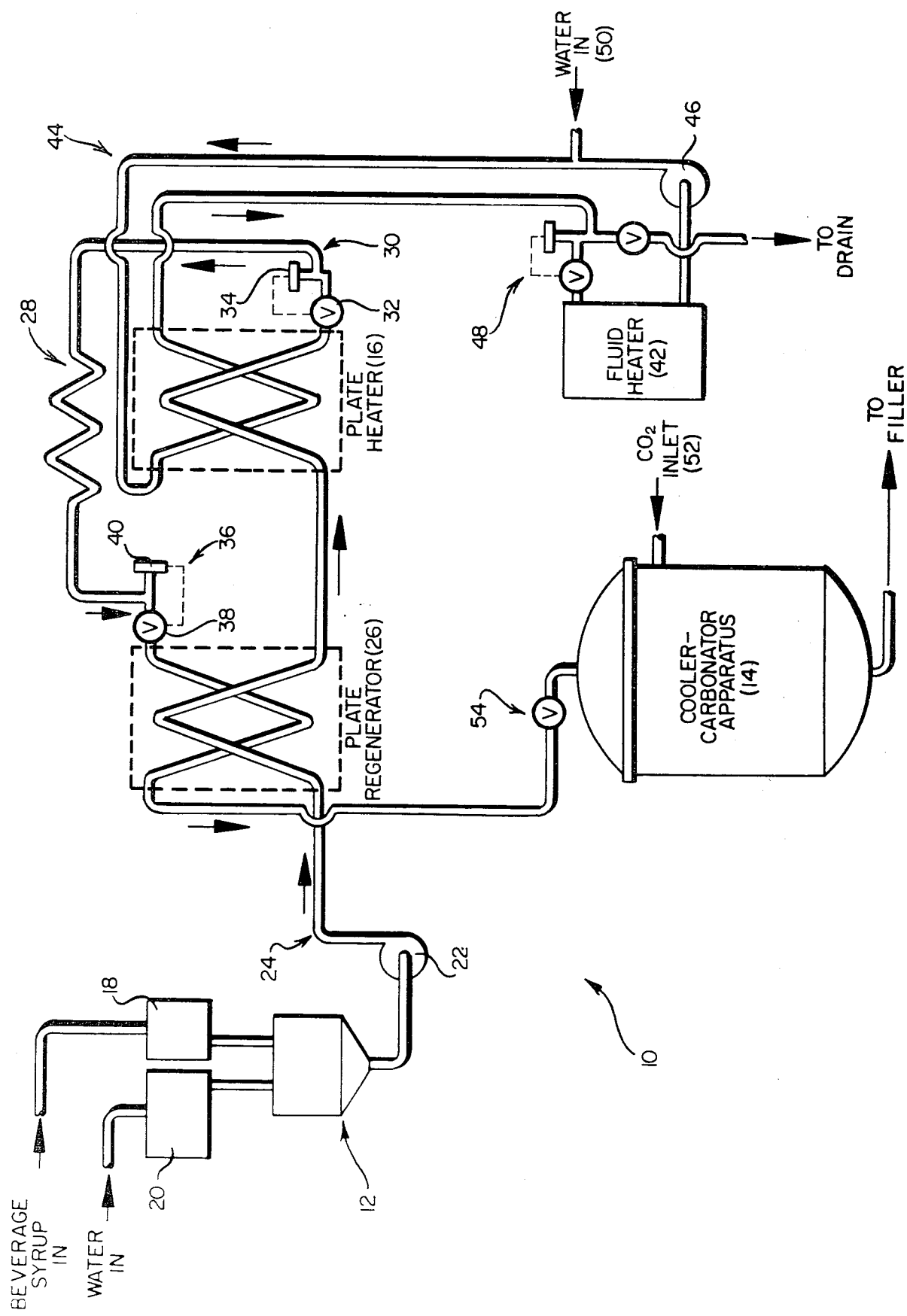

PASTEURIZING SYSTEM FOR CARBONATED SOFT DRINKS

FIELD OF THE INVENTION

This invention relates generally to beverage packaging systems and more particularly to systems for packaging soft drinks. Specifically, the present invention relates to pasteurizing equipment for non-dairy, non-alcoholic beverages.

BACKGROUND OF THE INVENTION

Systems for packaging soft drinks in bottles or cans ordinarily omit a pasteurizing station. The stored beverage syrup conventionally possesses a sugar concentration of at least about 32° Baume; and a product of this elevated sugar content will not support microbiological growth. In practice, the beverage syrup is not diluted to a level where contaminant organisms might proliferate until immediately prior to carbonation and filling in the selected packages. Hence, the need for pasteurization has not existed heretofore.

In circumstances, such as may obtain in certain foreign countries for example, where the demand for carbonated drinks and the like is only of very recent origin and experienced packaging personnel are generally unavailable, and where sugar supplies are frequently of variable quality, pasteurization has proved to be a worthwhile precaution. However, heating finished soft drink products to pasteurization temperature can risk the ultimate quality of the beverage as a result of oxidizing the flavor essences or darkening because of sugar carmelization.

Prior art pasteurizing schemes for soft drinks have commonly employed means providing return circulation of quantities of the pasteurized beverage to the fresh product inlet upon those occasions when forward flow is interrupted as a consequence of intermittent demand at the filler, or otherwise. This type of flow control has been found to aggravate color and flavor problems and, depending upon the point at which the pasteurized product is fed back into the system, to introduce a possible source of microbiological contamination or at least product dilution.

BRIEF DESCRIPTION OF THE INVENTION

Applicants have found that the shortcomings of the prior art can be overcome by the provision of a single-pass or non-recirculating beverage pasteurization system.

Therefore, a general object of the present invention is to provide a new and improved soft drink pasteurization system.

Another object of the invention is to provide a non-dairy soft drink pasteurization system which is economical to construct and simple to operate.

These and other objects and features of the invention will become more apparent from a consideration of the following descriptions.

BRIEF DESCRIPTION OF THE DRAWING

The invention, both as to its construction and its mode of operation, will be better understood by reference to the following disclosure and drawing forming a part thereof, wherein the single FIGURE of drawing is a schematic illustration of a soft drink pasteurization system constructed in compliance with the present invention.

DETAILED DESCRIPTION OF THE INVENTION

Referring now in detail to the drawing, a soft drink packaging system is indicated generally by the reference numeral 10. The packaging system 10 broadly comprises a supply arrangement for providing a flow of prepared beverage liquid, equipment for cooling and carbonating that liquid, heat exchange means for elevating the temperature of the beverage liquid and suitable fluid circuitry for controlling the transport of the beverage liquid and the selected heat exchange medium. More specifically, the packaging system 10 comprises a beverage mixing unit 12, cooler-carbonator apparatus 14 and a single-pass plate heater 16 situated flowpathwise between the mixing unit 12 and the cooler-carbonator apparatus 14.

The beverage mixing unit 12 receives beverage syrup or concentrate from a suitable supply tank 18 and corresponding beverage-quality water from a companion holding tank 20. In addition, the mixing unit 12 serves to proportion accurately the water and beverage syrup according to known principles. One eminently useful arrangement for such a beverage mixing unit is disclosed in U.S. Pat. No. 3,237,808 which issued Mar. 1, 1966, in the names of Chester J. Witt, Sigmond P. Skoli and Harry G. Mojonnier. The prepared beverage liquid passes from the mixing unit 12 to the inlet or suction side of a discharge pump 22 which delivers the product to the plate heater 16 through a closed, beverage piping circuit 24. Advantageously, a singlepass plate regenerator 26 is incorporated in the piping system 24 in order to recover heat from the pasteurized beverage syrup, as will be described more fully hereinafter.

In order that the heat imparted to the beverage liquid by the plate heater 16 may penetrate and be uniformly distributed, whereby to destroy or inactivate heatsensitive spoilage organisms which may be present in the beverage liquid, a holding tube 28 is interposed in the fluid transport line substantially immediately downstream from the plate heater 16. In addition and particularly for start-up operations, a temperature responsive valve arrangement 30 is situated between the holding tube and the plate heater. The valve arrangement 30 cycles the flow of beverage product exiting from the plate heater and comprises an air-actuated valve 32 which is opened and closed in compliance with the beverage product temperature sensed by a thermostatic regulator 34. Thus, when beverage liquid is first passed to the plate heater 16, that initial quantity of product may be held briefly in the plate heater until it has, in general, reached the selected pasteurization temperature before being passed in the downstream direction.

Similarly, adequacy of the holding time in tube 28 is assured by situating a temperature responsive valve arrangement 36 immediately downstream of the holding tube. Valve arrangement 36 like the valve arrangement 30 cycles the flow of beverage product exiting the holding tube 28 and generally includes an air-actuated valve 38 which is opened and controlled pursuant to the beverage product temperature which is sensed by a thermostatic regulator 40. Because it is desirable to reduce the cooling load imposed on the apparatus 14, the plate regenerator 26 is advantageously arranged to transfer heat from the pasteurized beverage liquid exiting holding tube 28 to the inlet product being delivered in forward flow condition by the discharge pump 22.

The prepared beverage liquid is heated to the selected pasteurization temperature in the plate heater 16 by transfer of heat from a suitable heat transfer medium, such as hot water, passing from a fluid heater 42. A closed fluid circuit 44 circulates the heat exchange medium between the plate heater 16 and the fluid heater 42; and for this purpose, a discharge pump 46 is arranged with its inlet or suction side in communication with the heater 42 as is illustrated in the drawing. If desired, a temperature responsive valve arrangement 48 is employed to regulate the flow through fluid circuit 44 and to dump the system to drain when desired. In addition, initial charge or make-up water may be introduced into the fluid circuit 44 from a water inlet line 50.

The cooler-carbonator apparatus 14 reduces the temperature of the beverage liquid to a desired filling temperature and simultaneously effects carbonation. Such apparatus is well-known in the art and includes refrigerated surfaces over which thin films of the beverage liquid fall in the presence of an atmosphere of carbon dioxide gas introduced from an inlet source 52. Suitable back-pressure valving 54 is provided in the beverage fluid circuit 24 immediately in advance of the cooler-carbonator apparatus 14; and the finished beverage liquid is delivered to suitable filler apparatus for containerization in bottles or cans.

It will be apparent from the foregoing descriptions that applicants have provided a single-pass beverage pasteurization system of simple construction and simple operation. Accordingly, the specified embodiment herein shown and described should be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. A pasteurizing system for soft drinks comprising: supply means providing a flow of prepared beverage liquid; means for cooling and carbonating said liquid; heat exchange means disposed flowpathwise between said supply means and said means for cooling and carbonating the beverage liquid; first fluid transport means including a holding tube between said heat exchange means and said means for cooling and carbonating the beverage liquid for providing a closed, beverage circuit from said supply means to said heat exchange means and from said heat exchange means to said means for cooling and carbonating the beverage liquid; and second fluid transport means for providing a closed circuit for a heat exchange medium, in communication with said heat exchange means.

2. A pasteurizing system for soft drinks according to claim 1 wherein said first fluid transport means includes heat recovery means disposed flowpathwise downstream from said heat exchange means.

3. A pasteurizing system for soft drinks according to claim 1 which further includes temperature responsive valve means disposed flowpathwise downstream from said heat exchange means.

4. A pasteurizing system for soft drinks according to claim 1 wherein said first fluid transport means includes a holding tube between said heat exchange means and said means for cooling and carbonating the beverage liquid.

5. A pasteurizing system for soft drinks according to claim 4 wherein said first fluid transport means further includes heat recovery means disposed flowpathwise downstream from said holding tube.

6. A pasteurizing system for soft drinks according to claim 4 which further includes temperature responsive valve means disposed flowpathwise downstream from said holding tube.

* * * * *